J. SCHUSTER.
HOG CATCHER.
APPLICATION FILED FEB. 17, 1908.
900,889. Patented Oct. 13, 1908.
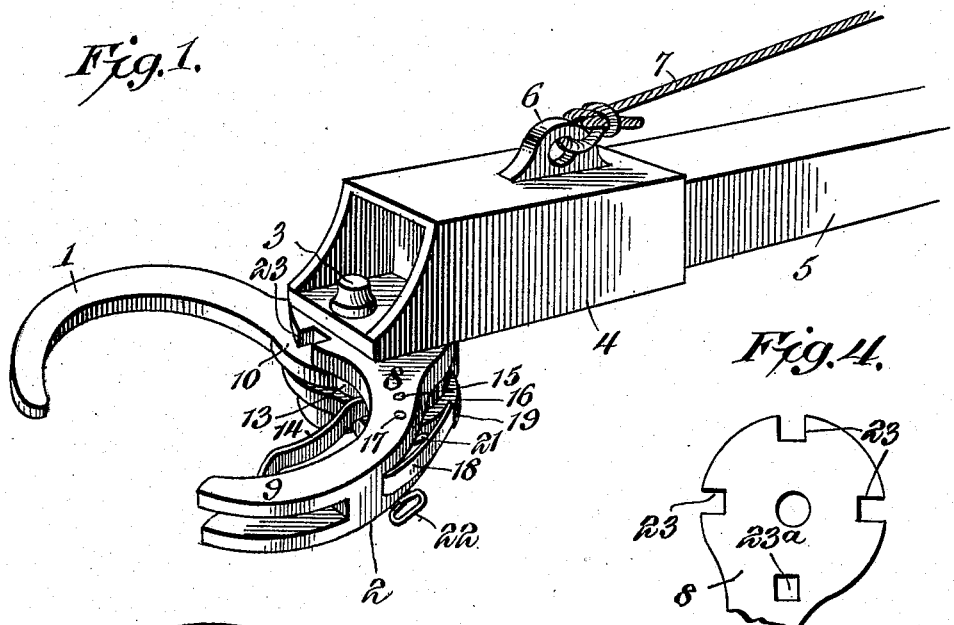
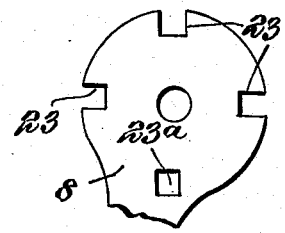
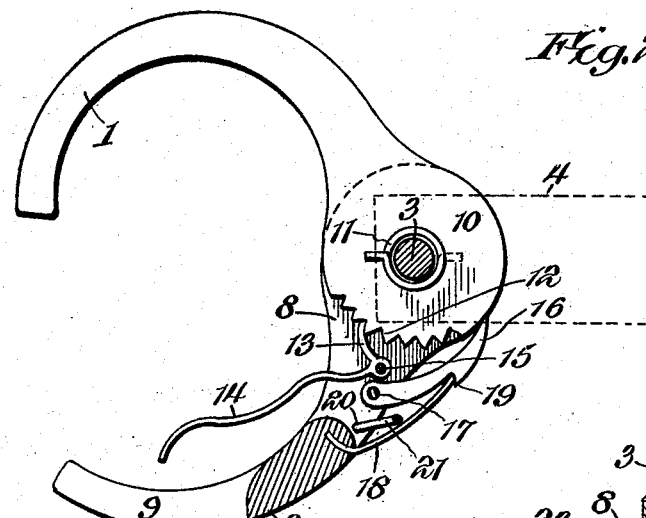
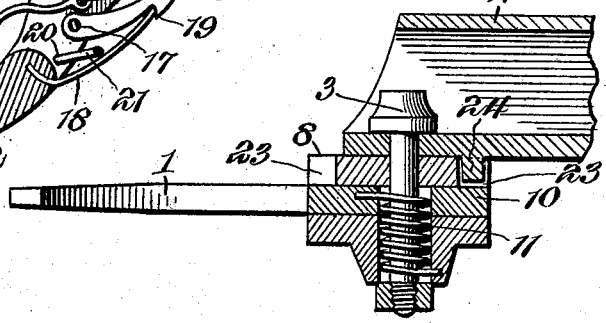
John Schuster, Inventor,
Witnesses
Howard D. Orr
H. T. Riley
By E. G. Siggers
Attorney

UNITED STATES PATENT OFFICE.

JOHN SCHUSTER, OF CLAY BANKS, WISCONSIN.

HOG-CATCHER.

No. 900,889.  Specification of Letters Patent.  Patented Oct. 13, 1908.

Application filed February 17, 1908. Serial No. 416,314.

*To all whom it may concern:*

Be it known that I, JOHN SCHUSTER, a citizen of the United States, residing at Clay Banks, in the county of Door and State of Wisconsin, have invented a new and useful Hog-Catcher, of which the following is a specification.

The invention relates to improvements in hog catchers.

The object of the present invention is to improve the construction of hog catchers, and to provide a simple and comparatively inexpensive device of great strength and durability, capable, when engaged with the leg of an animal, of automatically gripping the same and of securely locking the gripping jaws in their engaging position.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a hog catcher, constructed in accordance with this invention. Fig. 2 is a horizontal sectional view. Fig. 3 is a vertical longitudinal sectional view. Fig. 4 is a detail view of the inner end of one of the jaws.

Like numerals of reference designate corresponding parts in all the figures of the drawing.

The hog catcher, which may be made in various sizes to adapt it for large and small animals, is equipped with a pair of jaws 1 and 2, pivoted by a bolt 3, or other suitable fastening device, to a hollow shank 4. The hollow shank 4 forms a socket for a removable pole 5, and it is equipped with an eye 6 for the attachment of a line 7, so that after a hog, or other animal has been caught, the pole may be used to permit the animal to be held by the line.

The jaw 2 is provided with bifurcated inner and outer portions 8 and 9 to receive the inner and outer portions of the jaw 1, the bifurcated outer portion 9 permitting the outer terminals of the jaws to overlap when closed, whereby the leg of an animal is securely confined within the device. The inner bifurcated portion 8 of the jaw 2 is enlarged to receive the enlarged inner end or head 10 of the jaw 1, and the inner ends or jaws are provided with registering openings for the reception of the pivot bolt 3. The pivot bolt receives a coiled spring 11, connected at its terminals with the jaws 1 and 2 and adapted to close the same automatically, when the device is tripped, as hereinafter explained. In practice the spring will be of a strength to adapt it to the character of the kind of animal to be operated on by the device.

The inner or enlarged end 10, which is circular, is provided at its inner side or edge with a series of ratchet teeth 12, adapted to be engaged by an arm or engaging portion 13 of a trigger 14, pivoted by a pin 15 in the inner bifurcation of the jaw 2 and extending into the space between the jaws 1 and 2, when the device is set, as illustrated in Fig. 2 of the drawing. The toothed or engaging portion 13 is arranged at an angle to the body portion of the trigger, and when the latter is swung backward or outward in the direction of the outer portion of the jaw 2 until in contact with the leg of an animal, the engaging portion 13 is disengaged from the ratchet teeth, and the spring 11 automatically closes the jaws.

The jaws are automatically locked in their closed position by means of a dog 16, pivoted at its outer end in the inner bifurcation of the jaw 2 by a pin 17, or other suitable fastening device and extending inwardly and rearwardly. The dog 16, which is curved longitudinally, is provided with a pointed inner end, which is held against the inner end or head 10 of the jaw 1 by a spring 18, secured at one end to the jaw 2 and having its inner end free and engaging the dog 16 adjacent to a shoulder 19 thereof. The shoulder 19 is formed by a notch, and the free end of the spring is interlocked with the dog by the shoulder, and is disposed at an angle to the pivoted portion thereof to provide a space for an operating member 20, consisting of a rod provided with a central crank 21 and having an exterior handle 22. The rod is pivotally mounted on the inner bifurcated portion of the jaw 2, and it is adapted to be partially rotated by the handle 22 for swinging the spring 18 and the dog 16 outward to disengage the said dog from the jaw 1. This will permit the jaws to be opened and set in their open position by means of the trigger 14.

The pivoted jaws are adapted to be arranged centrally with relation to the front end of the tubular shank 4, or they may be adjusted to either side of the same, and any suitable means may be provided for maintaining them in their adjustment with relation to the shank 14.

The jaw 2 is provided at its inner end with side and rear notches 23 and a front opening 23ª, adapted to enable the jaw to be interlocked with a square lug 24, formed integral with the tubular shank. The front opening 23ª is located in advance of the pivot and substantially centrally with relation to the opposite sides of the jaw. The nut of the bolt is loosened to permit the inner end of the jaw to be engaged with and disengaged from the lug of the shank 4, and by providing the side and rear recesses 23 and the front opening 23ª, the jaws may be set to operate either centrally of the shank or at either side thereof. This adjustment of the jaws with relation to the shank also enables them to be compactly arranged for storing or shipping. The lug prevents the jaws when set from swinging on the pivot, which connects them to the outer end of the tubular shaft. Any number of notches may be employed to secure the desired range of adjustment.

Having thus fully described my invention, what I claim as new and desire to secure by Letters Patent, is:—

1. An animal catcher of the class described including a pair of pivoted jaws, one of the jaws being provided with ratchet teeth, a trigger mounted on the other jaw for engaging the ratchet teeth to lock the jaws in their open position, and a dog also mounted on the jaw, to which the trigger is pivoted, arranged for engaging the ratchet teeth to lock the jaws in their closed position.

2. An animal catcher of the class described including a pair of pivoted jaws, one of the jaws being provided with ratchet teeth, a trigger mounted on the other jaw and provided with means for engaging the teeth to lock the jaws in their open position, a dog also mounted on the jaw, to which the trigger is pivoted, for engaging the ratchet teeth to lock the jaws in their closed position, and means for automatically closing the jaws when the trigger is disengaged from the ratchet teeth.

3. An animal catcher of the class described comprising a pair of pivoted jaws, one of the jaws having its inner end bifurcated and the other jaw being fitted in the bifurcation and provided with ratchet teeth, a trigger mounted in the bifurcated jaw and having an arm for engaging the ratchet teeth to lock the jaws in their open position, a spring actuated dog mounted in the bifurcated jaw and arranged to engage the ratchet teeth for locking the jaws in their closed position, and an operating device for swinging the dog out of engagement with the ratchet teeth.

4. An animal catcher of the class described comprising a pair of pivoted jaws, one of the jaws being provided with ratchet teeth, a dog mounted on the other jaw and arranged to engage the ratchet teeth for locking the jaws in their closed position, a spring secured at one end and having its other end interlocked with the dog, and an operating device mounted for rotary movement and having a crank arranged between the dog and the spring for engaging the latter, said operating member being also provided with exterior operating means.

5. An animal catcher of the class described comprising a tubular shank adapted to receive a removable handle and provided with an ear for the attachment of a line, a pair of jaws pivoted to the shank, one of the jaws being provided with teeth, a trigger mounted on the other jaw for engaging the teeth to lock the jaws in their open position, and a dog also arranged for engaging the teeth to lock the jaws in their closed position, said dog being carried by the jaw on which the trigger is mounted.

6. An animal catcher of the class described comprising a pair of pivoted jaws, one of the jaws having its ends bifurcated and the other jaw having its inner end fitting in the inner bifurcation and provided with ratchet teeth, the outer end of the jaw having the teeth being arranged to extend into the outer bifurcation when the jaws are closed, a trigger mounted on the bifurcated jaw for engaging the teeth to lock the jaws in their open position, and a dog also mounted on the bifurcated jaw for engaging the teeth to lock the jaws in their closed position.

7. An animal catcher of the class described comprising a shank provided with an integral lug, a pair of jaws pivoted to the shank, one of the jaws being provided with means for engaging the lug of the shank, whereby such jaw is adjustably interlocked with the shank and held against pivotal movement, a trigger for holding the jaws in their open position, and means for closing the jaws.

8. An animal catcher of the class described comprising a shank provided with a lug, a pivoted bolt mounted on the shank, jaws pivoted to the shank by the bolt, one of the jaws being provided with side and rear notches and a front opening arranged to receive the lug, whereby such jaw is interlocked with the shank to set the jaws either directly in front of or at either side of the shank, and means for operating the jaws.

In testimony, that I claim the foregoing as my own, I have hereto affixed my signature in the presence of two witnesses.

JOHN SCHUSTER.

Witnesses:
M. T. PARKER,
E. J. PARKER.